E. O. BULMAN.
EGG CARRIER.
APPLICATION FILED JUNE 28, 1909.
958,087.
Patented May 17, 1910.
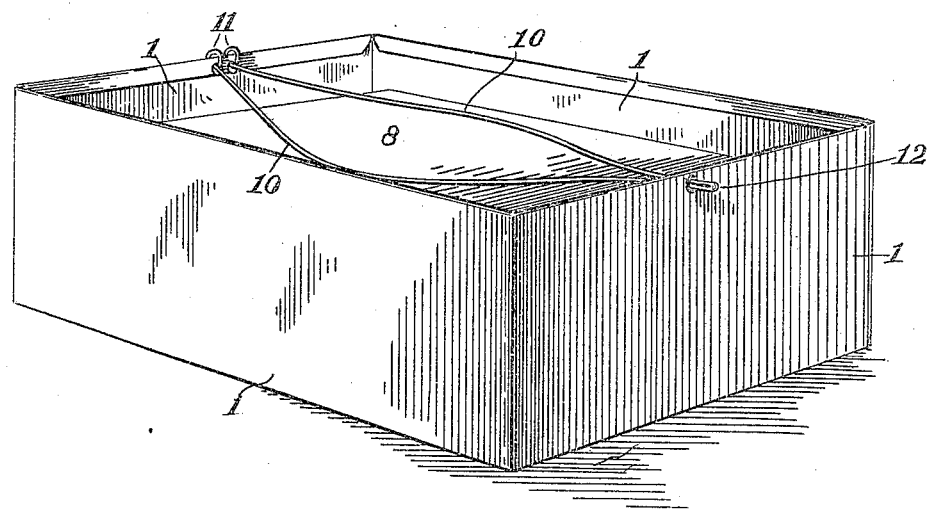
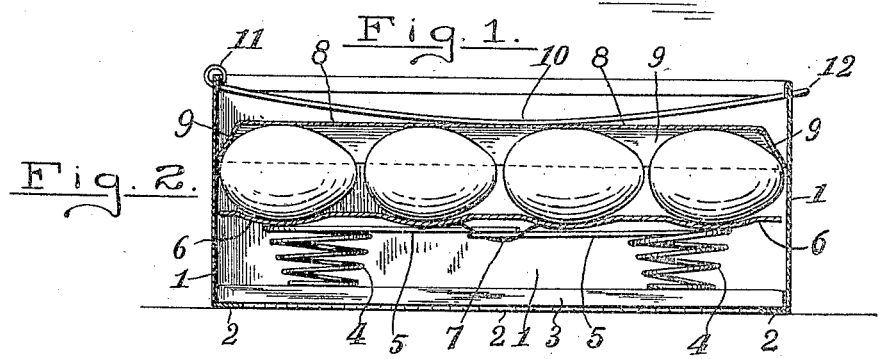
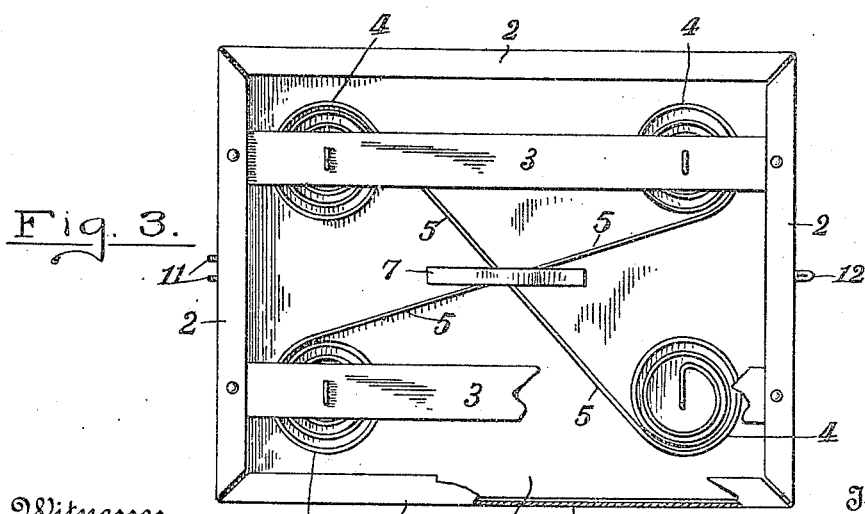
Witnesses
H. O. Van Antwerp
Minnie Johnson.
Inventor
ELVAH O. BULMAN
BY Luther V. Moulton
Attorney

UNITED STATES PATENT OFFICE.

ELVAH O. BULMAN, OF GRAND RAPIDS, MICHIGAN.

EGG-CARRIER.

958,087.  Specification of Letters Patent.  Patented May 17, 1910.

Application filed June 28, 1909. Serial No. 504,746.

*To all whom it may concern:*

Be it known that I, ELVAH O. BULMAN, a citizen of the United States of America, residing at Grand Rapids, in the county of Kent and State of Michigan, have invented certain new and useful Improvements in Egg-Carriers; and I do hereby declare the following to be a full, clear, and exact description of the invention, such as will enable others skilled in the art to which it appertains to make and use the same.

My invention relates to improvements in egg carriers, and its object is to provide the same with improved means for yieldingly supporting the eggs; to provide improved means for holding the eggs securely in place; to provide a cheap, simple, and reliable device, and to provide the same with various new and useful features hereinafter more fully described and particularly pointed out in the claims, reference being had to the accompanying drawings, in which:

Figure 1 is a perspective of a device embodying my invention as it appears when in use; Fig. 2 a longitudinal vertical section of the same; and, Fig. 3 and inverted plan view of the same with parts broken away.

Like numbers refer to like parts in all of the figures.

1 represents the case, which consists of four vertical walls united at the angles in the form of a parallelogram. These walls are preferably made of sheet metal and provided with inwardly turned flanges 2 at the bottom, to which flanges are secured bottom bars 3 suitably spaced apart, upon which bars are secured coiled springs 4, preferably four in number and united in pairs by diagonally extended connecting wires 5 which cross at the center of the structure and upon which wires, together with the springs, is supported a vertically yieldable bottom plate 6, upon which the eggs are placed and yieldingly supported. This bottom plate is preferably secured to the wires 5 where they cross by means of a strap 7.

To hold the eggs in place and prevent them from contacting each other, an indentation to receive each egg is formed in the bottom plate, as indicated in Fig. 2, and an upper member is provided which rests upon the eggs, preferably consisting of an inverted tray 8 of suitable material, preferably somewhat flexible, such as pasteboard or cardboard, and having its edges turned downward preferably at an angle of about thirty degrees from the vertical, and extending between the outermost eggs and the case. Resting upon this plate 8 and yieldingly pressing the same upon the eggs is a yielding clamp, preferably consisting of an integral piece of wire folded at the middle and detachably inserted in an opening near the top of one end of the case, as at 12. This wire thence diverges, or is curved outward, throughout the middle portion and also curved downward, and at its ends is pivotally connected to the opposite end of the case near the top thereof, for which purpose the ends of the wire are bent in circular form and inserted in openings in the case, as at 11.

By springing the curved middle portion of this clamp outward, it is shortened sufficient to disengage the end 12 from the opening and replaced in like manner. This clamp thus serves as a yielding member to hold the tray 8 down upon the eggs and prevent the same from moving or coming in contact with each other. The eggs are thus supported between upper and lower spring supports and yieldingly clamped between the bottom 6 and tray 8, whereby they may be safely transported or handled without breakage.

What I claim is:

1. An egg carrier, comprising vertical walls having inwardly turned bottom flanges, bars supported by the flanges, springs supported by the bars, a bottom supported by the springs, an inverted tray above the bottom, and a yieldable and removable clamp above the tray.

2. An egg carrier, comprising vertical walls having inwardly turned bottom flanges, bars secured to the flanges and supported thereby, springs secured to the bars and supported thereby, a bottom secured to the springs and supported thereby, a detached inverted tray above the bottom and having downwardly extended margins, and a yieldable and removable clamp above the tray.

3. An egg carrier, comprising four vertical walls forming a parallelogram and joined at the angles, inturned flanges at the bottom said walls, bars secured to the flanges and spaced apart, coiled springs supported by the bars and connected by diagonal and crossed wires, a bottom supported by the springs and wires, an inverted tray above the bottom and having downwardly and outwardly extended margins to engage the outer eggs, and a yieldable and removable clamp engaging the tray.

4. An egg carrier, comprising a case having an opening in one end, a tray to engage and hold eggs in the case, and a clamp to hold the tray formed of a resilient wire folded near the middle and having its folded end detachably inserted in the opening in the case by spreading apart of its side portions and also having its ends pivoted to the opposite end of the case.

5. An egg carrier, comprising a case having openings in its respective ends, a tray to engage and hold eggs in the case, and a resilient wire bent at the middle and inserted in an opening in one end of the case, and having its parts oppositely curved outward and downward to engage the tray and having its ends each turned in circular form and inserted in openings in the other end of the case.

6. An egg carrier, consisting of four rectangular vertical walls forming a parallelogram joined at the angles, inwardly turned flanges at the bottom of said walls, bars attached to said flanges and supported thereby, coiled springs attached to the bars and supported thereby, diagonal and crossed wires connecting the springs in pairs, a bottom supported by the springs and wires and attached thereto, an inverted tray having outwardly and downwardly inclined margins, and a wire clamp folded at the middle and detachably inserted in an opening in one end of the case, the members of said clamp being curved outward and downward to engage the tray and having its ends in circular form and inserted in openings in the other end of the case.

In testimony whereof I affix my signature in presence of two witnesses.

ELVAH O. BULMAN.

Witnesses:
GEORGIANA CHACE,
LUTHER V. MOULTON.